Nov. 9, 1943.  E. KELLERMAN ET AL  2,333,795
DEMONSTRATION KIT FOR MECHANICAL DENTISTRY
Filed Dec. 23, 1941  2 Sheets-Sheet 1
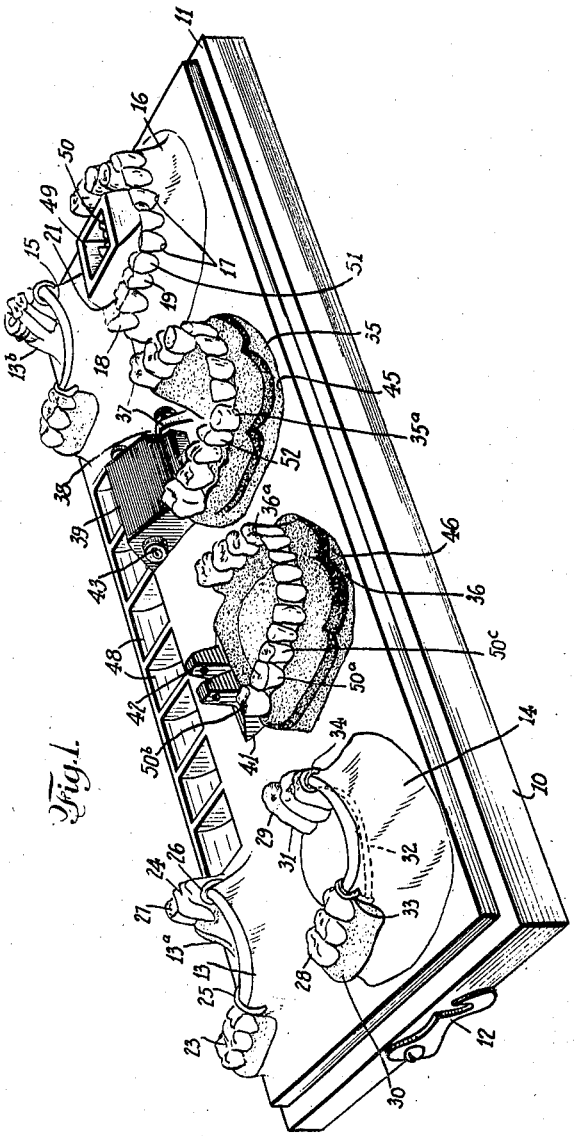
INVENTORS
ERNEST KELLERMAN
MAX O. DUKAS
BY Nov. 9, 1943.   E. KELLERMAN ET AL   2,333,795
DEMONSTRATION KIT FOR MECHANICAL DENTISTRY
Filed Dec. 23, 1941   2 Sheets-Sheet 2
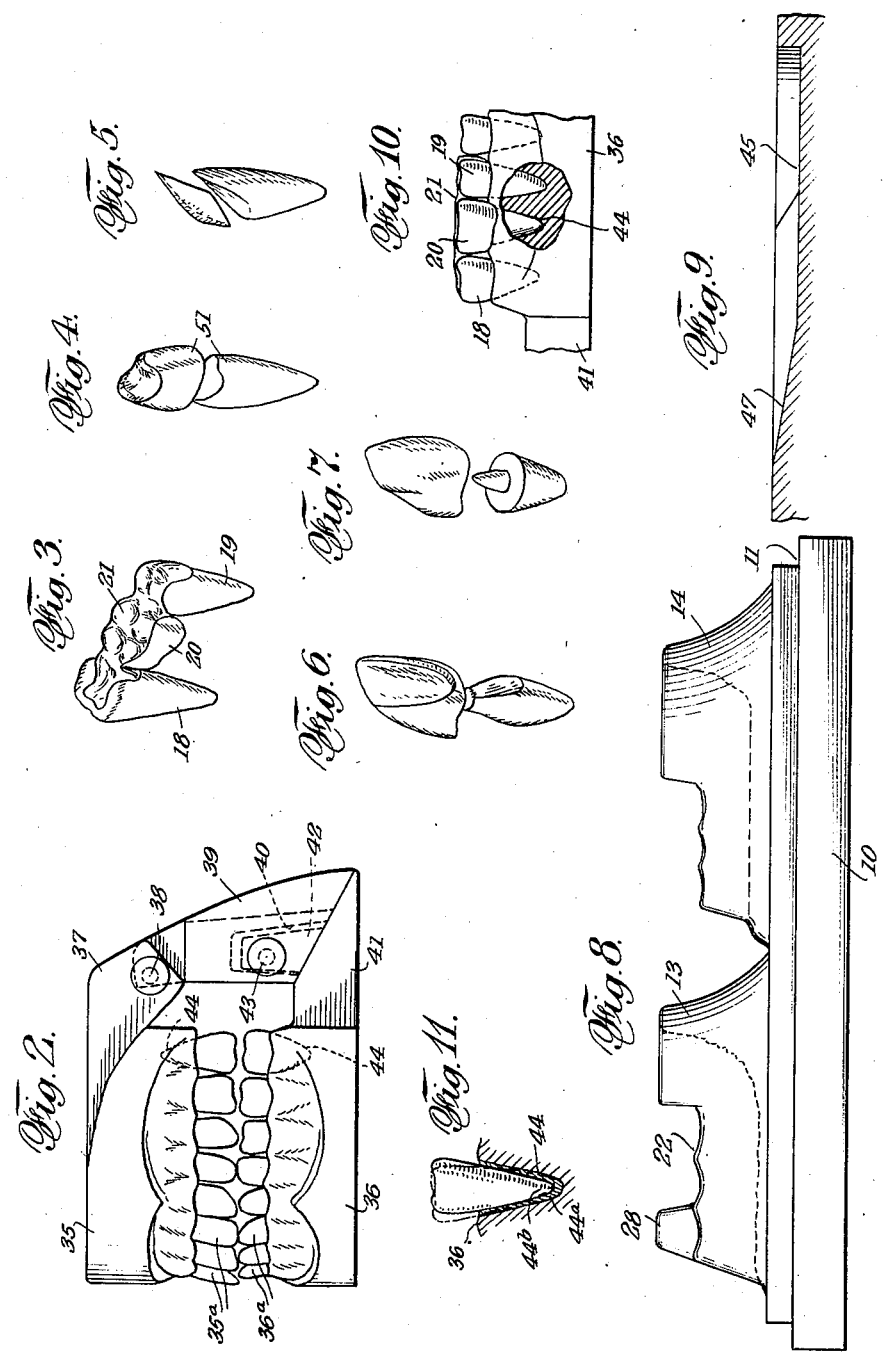
INVENTORS
ERNEST KELLERMAN
MAX O. DUKAS
BY
Leon M. Straus Patented Nov. 9, 1943

2,333,795

UNITED STATES PATENT OFFICE 2,333,795

DEMONSTRATION KIT FOR MECHANICAL DENTISTRY

Ernest Kellerman and Max O. Dukas, New York, N. Y.

Application December 23, 1941, Serial No. 424,102

1 Claim. (Cl. 32—71)

This invention relates to demonstration kits for mechanical dentistry.

While it is well known to use articulated devices for demonstrating the position and relation of teeth both natural and artificial as they are located in the human mouth, the dentist hasn't ready access to various tooth forms but must seek them out from various places. In order to make his task simpler in demonstrating tooth structures and forms to a patient or in schools, this invention contemplates a kit whereby all phases of mechanical dentistry may be set up for display and examination.

The invention has for a further object the provision of a dental demonstration kit whereby various types of tooth repair may be demonstrated as well as fixed or removable bridge work.

Briefly, the invention may be realized by providing a compact kit for dentists and laboratories in such practical form that various forms of teeth and tooth restorations, such as bridges, plates or the like and their relationship, may be shown or demonstrated.

The accompanying drawings, in an exemplary manner, show a preferred form of the invention and serve as the basis of the following detailed specification in which the objects of the invention are realized.

In the drawings:

Fig. 1 is a perspective view of a demonstration kit made in accordance with this invention.

Fig. 2 is a side view illustrating the cooperative relationship between demonstration units used in the kit.

Figs. 3-7 are each detailed perspective views (some of the views being shown in exploded condition) of tooth structures used in the kit.

Fig. 8 is a side view of a support base for the kit as seen from the left of Fig. 1.

Fig. 9 is a fragmentary cross-sectional view through the base showing a seat for one of the kit units.

Fig. 10 is a fragmentary view (partly in section) of a tooth structure applied to the lower part of the unit shown in Fig. 2.

Fig. 11 shows a fragmentary detail of tooth structure, showing its position and fixation in the cavity of one of the units of Fig. 2.

Referring to the drawings in greater detail, the various parts of the demonstration kit are supported as upon a base 10, said base being preferably cast or moulded either in metal or in any of the plastic compositions. The base may be formed with a peripheral step 11 which serves for a cover (not shown) for said kit, said cover being held in position as by means of latch hooks 12.

The base is preferably formed with a plurality of raised cast portions such as indicated at 13, 14, 15, and 16, the latter of said portions may be provided, as shown particularly in Fig. 1, with a plurality of holes 17 in simulation of the tooth anchorages in the human mouth. These holes may be each fitted with an artificial tooth structure as exemplified in Figs. 3-7. For instance, as shown in Fig. 3, the three teeth at the left of the raised portion 16 may be arranged as a permanent bridge, the teeth 18 and 19 representing teeth in the mouth of the patient, the tooth 20 representing the artificial tooth to be supplied, and the metal connecting portions 21, the bridge by means of which the artificial tooth 20 is anchored to the teeth 18 and 19.

Before the various types of tooth structures mounted in the raised portion 16 are more fully described, the other portions of the kit will be set forth so that a clearer understanding of the relationship of these tooth structures may be better understood.

The raised portion 13 may be formed with a recess such as shown at 22, on either side thereof, for the reception of sets of artificial teeth shown at 23 and 24, which form part of a partial plate adapted for use in the upper part of the mouth, the plate comprising an acrylic resin portion 13a having an artificial tooth set therein. Such a plate may be provided with clasps 25 and 26 and in certain instances may include a crown cap 27. The latter is designed to fit over a projection in the raised portion such as shown at 28.

The raised portion 14 may serve to support a plate for use in the lower part of the mouth, said plate may comprise the artificial teeth 28 and 29 embedded in acrylic resin material 30 and 31 connected as by a suitable acid-resistant, non-corrosive, metallic bridge member 32. This plate may also be provided with clasps 33 and 34.

The plate mounted on the raised portion 15 may also be for the upper part of the mouth and may be designed in a somewhat different manner from the plate shown on the raised portion 13. For instance, this plate, instead of having an acrylic resin bridging portion, may have a metallic bridging portion 13b similar to that shown at 32, but having contact with the palate of the mouth.

The kit may include a pair of simulated mouth portions arranged for articulation whereby the bite of a patient may be demonstrated. In this disclosure, these two portions as related to each other, will be termed an articulator.

One of the mentioned portions designated 35 may be designed to simulate the upper jaw and the other 36, the lower jaw. The upper jaw member may be provided with a rearward extension 37 carrying a pivot 38 for a pivotal lug 39 formed with a seat 40. The member 36 may be formed with a rearward extension 41 having upwardly directed post means 42 designed to be arranged in the seat 40. A pintle 43 may be provided to interconnect the portions 39 and 41 whereby the jaw portions 35 and 36 are arranged in proper relation to each other. As best seen in Fig. 2, the jaw portions are arranged so that one may be moved with respect to the other to illustrate and demonstrate the bite of a patient.

Each of the jaw portions 35 and 36 are provided with a plurality of tooth seats 44 similar to the holes 17 in the raised portion 16 and each receptive of a tooth, said tooth being either in simulation of a natural or an artificial tooth.

The base 10 may be formed with seats 45 and 46 respectively for the positioning upon said base of the jaw portions 35 and 36. The latter seat 45 is shown in Fig. 9, the sloping portion 47 of said seat serving to accommodate the part 39, and the remainder of said seat, the jaw portion 35.

In addition to the parts described, the kit, especially the base thereof, may be provided with a plurality of article-receiving pockets 48 and a receptacle 49 for a similar purpose arranged upon the raised portion 16. Fig. 1 illustrates at 50 certain metal parts such as inlays, amalgams, etc., resting in the receptacle 49.

The kit as above described, is arranged to have all of its tooth structures whether single or plural interchangeably fitted into the articulator jaw parts 35 and 36. As an example of what may be accomplished, should the tooth of the patient, as represented by the tooth 50a, be necessary to be replaced artificially, the dentist might decide upon constructing the permanent bridge such as shown in Fig. 3. In order to demonstrate to the patient the appearance, value and efficiency of such an arrangement, the bridge 21 may be transferred from the raised portion 16 and substituted for the tooth 50a and its two flanking teeth 50b, 50c, the latter being represented by the teeth 18, 19 supporting the bridge 21. With said bridge in place on the jaw part 36 and the other articulated portion 35 connected as shown in and described with respect to Fig. 2, a demonstration may thus be made as said bridge 21 will appear and will be seated in the mouth of the patient.

Any of the plates mounted on the raised portions 13, 14, and 15 may be similarly interchangeably arranged in respective articulator parts after certain teeth have been removed from the articulator parts 35 and 36.

As shown in Fig. 4, in addition to demonstrating a permanent bridge, the dentist may demonstrate a crowned tooth, said tooth being shown at 51 in Fig. 1 and Fig. 4. This latter artificial tooth may replace the tooth shown at 52 in one of the articulated members.

It is unnecessary to detail and exhaust all of the various types of artificial tooth structures available in mechanical dentistry. Figs. 5, 6, and 7 reveal certain examples thereof as related to single teeth. It may be evident, however, that by means of the kit herein disclosed and by means of suitable transposition of the teeth therein, a dentist may easily, quickly and effectively demonstrate, both to himself and to his patient, the type of dentistry to be performed.

It is to be noted that the novel kit is so constructed as to allow, by very simple means, also exact and true location and angular position of the teeth in the kit with respect to each other. This is particularly true of the single teeth in the movable base parts (articulator parts 35, 36), as well as in the fixed base parts, such as 16. This location and angular position of the teeth may thus be made to accord with the natural and individual position of teeth in the mouth of the patient.

To this end, each cavity 44 is relatively wide enough to permit a certain play between it and a tooth to be removably seated therein. On the bottom of each cavity there is provided a piece of wax or similar plastic mass 44a which adheres to the point or extremity 44b of the tooth set into said cavity and thus holds said tooth in any preferred condition and also in its angular position as indicated by dot-dash lines in Fig. 11. Said tooth may be conveniently placed by hand in said cavity and pressed against said wax piece 44a.

While the invention has been detailed with respect to the particular form illustrated, it should be apparent that variations within the contemplated scope of the invention may well be made by skilled persons without departing from the spirit and scope of the following claim.

What is claimed as new and desired to secure by Letters Patent, is:

A dental demonstration kit comprising a base, a plurality of raised portions on said base, examples of mechanical dentistry removably mounted on said raised portions, a lower jaw simulating member having seats for artificial teeth, an upper jaw simulating member having seats similar to those of said lower jaw member, means on said members adapting them for interconnected articulation, and artificial teeth in the mentioned seats and removable for replacement by the mentioned examples of mechanical dentistry.

ERNEST KELLERMAN.
MAX O. DUKAS.